Aug. 24, 1965    P. SMIT    3,202,286
FILTERING APPARATUS

Filed May 14, 1962    4 Sheets-Sheet 1

INVENTOR.
PIETER SMIT
BY
Joseph Montgomery
ATTORNEY.

Aug. 24, 1965 P. SMIT 3,202,286
FILTERING APPARATUS
Filed May 14, 1962 4 Sheets-Sheet 2

INVENTOR.
PIETER SMIT
BY
*Jph. Montgomery*
ATTORNEY.

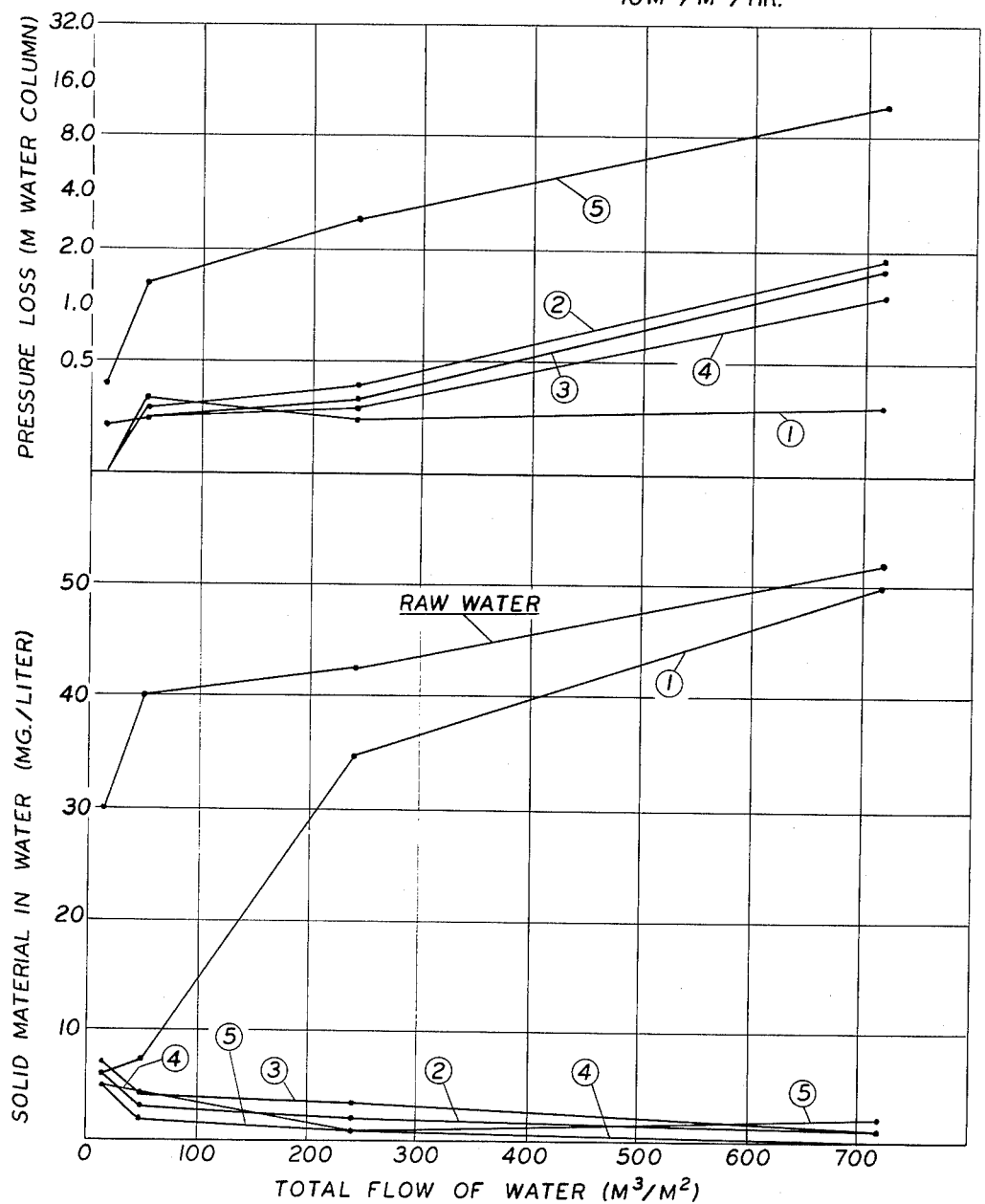

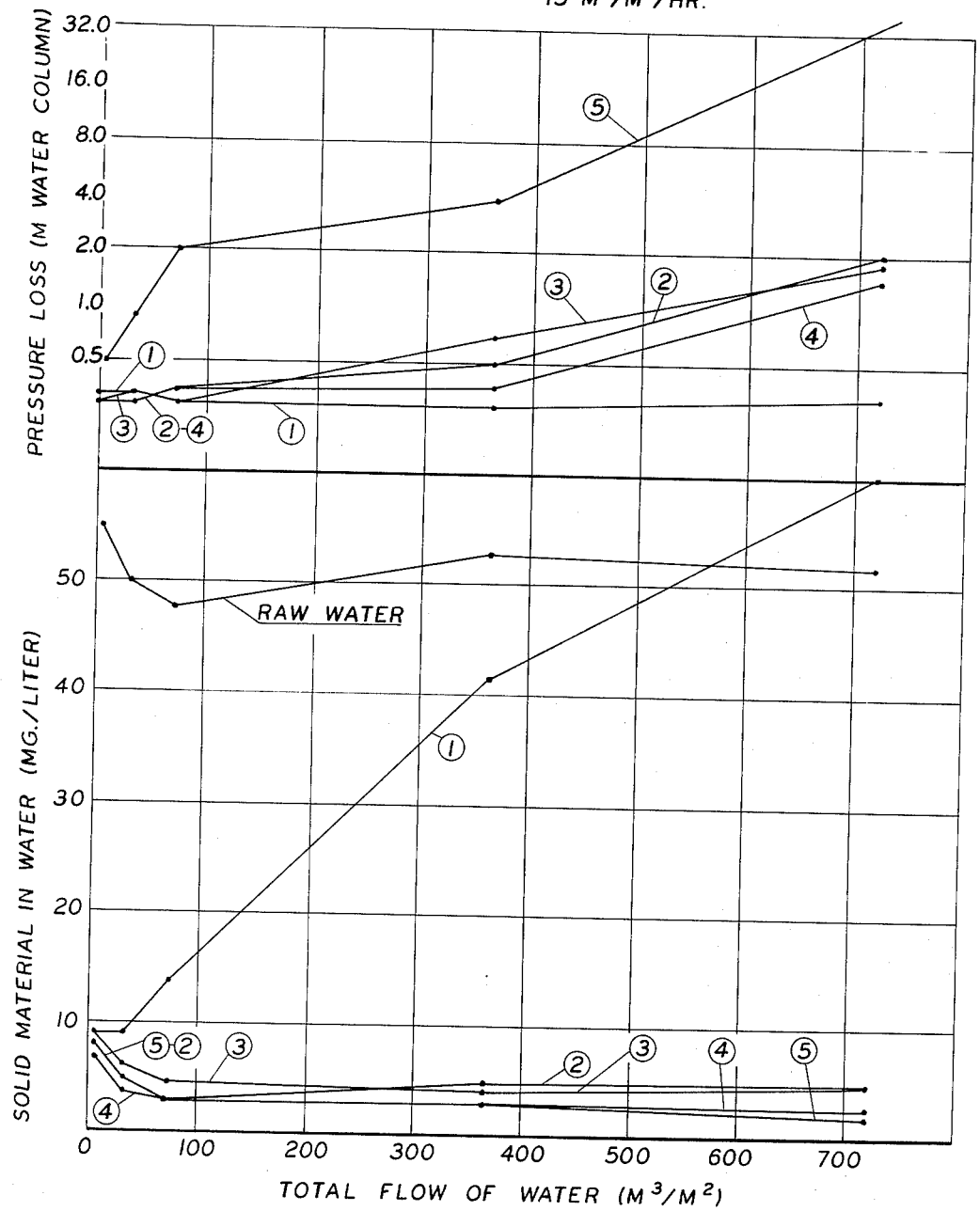

United States Patent Office 3,202,286
Patented Aug. 24, 1965

3,202,286
FILTERING APPARATUS
Pieter Smit, Santpoort, Netherlands, assignor to N.V. Octrooien Maatschappij "Activit," Amsterdam, Netherlands
Filed May 14, 1962, Ser. No. 194,620
14 Claims. (Cl. 210—286)

This invention relates generally to filtering apparatus, and more particularly is directed to improvements in filtering apparatus of the upflow type, that is, in which the liquid to be filtered is passed upwardly through a filter bed of granular solids. The present application is a continuation-in-part of my copending application Serial No. 824,318, filed July 1, 1959, and now abandoned.

In most filtering apparatus presently in use, the liquid to be filtered passes downwardly through a filter bed of granular solids, for example, as in the conventional method of filtering water through a bed of sand. Although it has already been suggested to filter a liquid by passing the latter upwardly through a filter bed of granular filtering solids, the previously proposed filtering apparatus of the upflow type has encountered difficulties in that the upward flow of the liquid through the filter bed tends to fluidize the bed and frequently produces cracks in the filter bed through which the liquid passes freely without undergoing the filtering action of the granular filtering medium. The appearance of such cracks in the filter bed is particularly a problem when it is desired to employ high rates of flow of the liquid to be filtered through the filter bed.

Accordingly, it is a general object of the present invention to provide a filtering apparatus of the upflow type in which cracking and fluidizing of the filter bed is avoided while permitting filtering of the liquid at a rate that has been heretofore thought to be unattainable even in filters of the downflow type.

Another object is to provide filtering apparatus of the upflow type in which cracking of the filter bed is prevented while avoiding an excessive pressure drop due to the passage of the liquid through the filtering apparatus.

A further object is to provide filtering apparatus of the upflow type in which cracking of the filter bed is avoided during normal filtering operation of the apparatus, and further in which the means employed for preventing cracking of the filter bed do not interfere with the washing or cleaning of the filter bed or with the classification of the grain size of the granular filtering material at the end of the washing operation when the filter bed is formed of layers of granular solid materials having different grain sizes, for example, progressively decreasing from the bottom of the filter bed to its top.

In accordance with an important aspect of the invention, cracking of the filter bed in a filtering apparatus of the upflow type is prevented by providing a grid or grating extending across the housing of the filtering apparatus within the filter bed at least at a location adjacent the top of the latter, such grid or grating having an open area equal to at least 75% of the total horizontal cross-sectional area of the housing and being formed of at least one series of parallel, horizontally extending elements.

The above, and other objects, features and advantages of the invention, will be apparent in the following detailed description of illustrative embodiments thereof which is to be read in connection with the accompanying drawings, forming a part hereof, and wherein:

FIGS. 10 and 11 are graphs presenting the results of tests conducted with filtering apparatus embodying this invention and with filtering apparatus having baffles as disclosed in the prior art.

Figure 1:
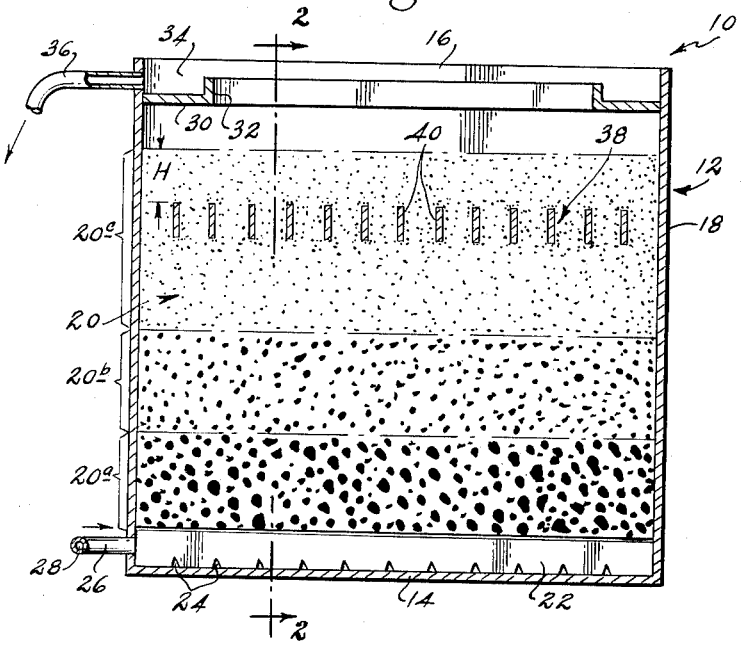
FIG. 1 is a vertical sectional view of a filtering apparatus constructed in accordance with one embodiment of this invention.
Figure 2:
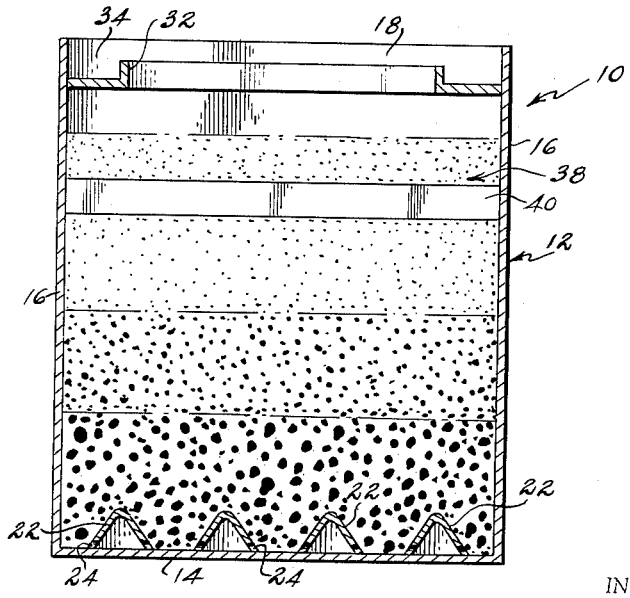
FIG. 2 is a transverse sectional view taken along the line 2—2 on FIG. 1.

Referring to the drawings in detail, and initially to FIGS. 1 and 2 thereof, it will be seen that a filtering apparatus embodying the present invention, and there generally identified by the reference numeral 10 includes a housing 12 which may be generally rectangular and made up of a bottom 14, side walls 16 and end walls 18.

The filtering apparatus 10, being of the upflow type, has the influent or liquid to be filtered introduced at the bottom of housing 12 for upward passage through a filter bed 20 contained in the housing, while the filtrate or effluent is withdrawn from housing 12 adjacent the top of the latter.

In order to ensure that the entire bed of solids forming the filtering medium will be uniformly effective in removing particles or impurities from the liquid flowing upwardly therethrough, the introduced liquid to be filtered is uniformly distributed at the bottom 14 of housing 12. For example, as shown in FIGS. 1 and 2, a series of inverted channels 22 are disposed in parallel, spaced apart relationship on bottom 14 and are formed with spaced apart notches 24 in their lower edges to define openings through which the liquid to be filtered can escape from the interior of each inverted channel 22 into the bottom portion of housing 12. The ends of inverted channels 22 abut against end walls 18 and supply pipes 26 (FIG. 1) open into the inverted channels 22 through one of the end walls 18 and extend from a manifold 28 which is connected, at one end, to a source (not shown) of the liquid to be filtered.

It will be apparent that the described inverted channels 22 merely cooperate with bottom 14 of the housing to define a distributing system for the liquid to be filtered, and may be replaced by other equivalent underdrains for effecting the uniform distribution of the liquid to be filtered over the bottom of housing 12. For example, the inverted channels 22 may be replaced by a series of perforated liquid supply pipes (not shown) extending parallel to each other over bottoms 14, or by a perforated false bottom (not shown) in housing 12 spaced from the bottom 14 so that the liquid to be filtered, when introduced into the space between the bottom 14 and such false bottom, will be uniformly distributed through the perforations of the latter, as is well known in the art.

A shelf or flange 30 is directed inwardly from side walls 16 and end walls 18 of housing 12 at a location a short distance downwardly from the top edges thereof, and an upstanding flange 32 extends along the inner edge of shelf or flange 30 to define an overflow or gutter 34 for receiving the effluent or filtrate which is withdrawn from the gutter 34 through an outlet pipe 36 (FIG. 1).

In the filtering apparatus 10, the filter bed 20 fills housing 12 to a level substantially below the collecting gutter 34 for the filtrate, and is formed of granular solids having particles in the size range between approximately 0.2 mm. and 10.0 mm. Further, the granular filtering solids forming the bed 20 are preferably arranged in successive layers, for example, as at 20a, 20b and 20c, having particles of different sizes which progressively decrease in the direction of the upward flow of the liquid through bed 20, that is, from a maximum particle size in the layer 20a at the bottom of bed 20 to a minimum particle size in the top layer 20c of the filter bed.

In the filtering apparatus 10 described above with reference to FIGS. 1 and 2, or in any other similar filtering apparatus of the upflow type, there is the danger that a high rate of flow of the liquid to be filtered through the filter bed will cause fluidizing or cracking of the latter so that open channels or cavities extending through the filter bed are formed and the liquid, taking the path of least resistance, will flow through the open channels or cavities without contacting the granular filtering solids, whereby the filtering action is rendered ineffectual. Such cracking of the filter bed results from the force of the flow of liquid overcoming the binding forces of the granular solids making up the bed 20.

In accordance with the present invention, cracking of the filter bed is avoided, even with flow rates of the liquid which have heretofore been unattainable, by providing at least one grid or grating 38 extending across housing 12 within filter bed 20 adjacent the top of the latter which is, in the case of the preferred filter bed mentioned above, formed of the layer 20c of particles of filtering material having the minimum sizes.

Figure 3:
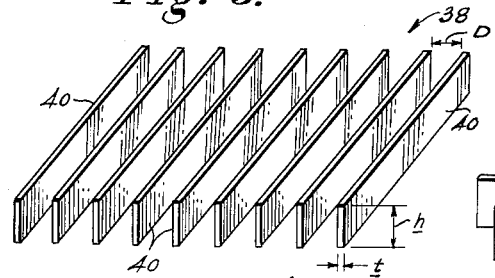
FIG. 3 is a perspective view of a grid or grating included in the filtering apparatus of FIGS. 1 and 2 to prevent cracking of the filter bed.

In its simplest form, as shown in FIGS. 1, 2 and 3, the grid or grating 38 may consist of a single series of parallel, spaced apart horizontally extending bars 40 having rectangular cross-sections and being arranged with their largest cross-sectional dimensions extending vertically. The bars 40 may extend laterally across housing 12 and have their opposite ends welded or otherwise secured to side walls 16. In order to prevent cracking of filter bed 20 while avoiding the development of an excessive pressure loss or interference with washing or cleaning of the bed, the grid or grating 38 must have an open area which is at least 75% of the total cross-sectional area of housing 12, such open area being determined by the thickness t of each of the bars 40 and the distance D between adjacent bars 40 (FIG. 3).

The spacing or distance between the strips or bars 40, which determines the dimensions of the cells or compartments formed therebetween and opening at the top and bottom, may vary for different applications of the filtering apparatus embodying the invention. The smaller the dimensions of the cells defined by the strips or bars 40 of grating 38, the greater can be the pressure applied to the liquid to be filtered for passing the latter through filter bed 20, and therefore the greater can be the rate of flow of the liquid without the danger of cracking the filter bed. However, it is not always desirable to make the dimensions of the cells of grating 38 unnecessarily small, for the filter must be capable of being easily cleaned by backwashing of the bed 20. During such cleaning of bed 20, the granular filtering solids of the latter have to be broken through. In certain cases, breaking through of the filter bed can be initiated with the aid of air or by rinsing the bed loose with a liquid or even mechanically, from the top. However, it is better to have the filtering medium in the cell of grating 38 broken through by an increased rate of flow of upwardly directed liquid, and this can be effected either by removal of the granulated filtering solids disposed above the grating 38 by the high speed flow of the liquid, or by locally introducing liquid under the strips or bars 40 and thereby breaking down the vault or downwardly curved arch formed by the solids under each of the cells between adjacent strips or bars 40 and which is the primary means by which the upwardly directed forces exerted by the liquid are distributed within the bed 20. It is apparent that a vault or downwardly curved arch formed under cells 46 having large cross-sectional areas will break down at a lower rate of flow of the liquid than one defined under cells 46 having relatively small cross-sectional areas, and thus it is obvious that the distances D between the adjacent strips or bars should not be any smaller than necessary.

The distances D are determined by the desired rate of flow of the liquid to be filtered, the sizes of the particles making up the filter bed, the specific gravity, elasticity, compressibility, cohesion and adhesion of the particles, the form or shape and coefficient of friction between the particles of the filter bed, the coefficient of friction between the particles and the liquid to be filtered, the total depth of the filter bed, the depth of that portion of the filter bed disposed above grating 38, the specific gravity and viscosity of the liquid, the difference between the pressures of the liquid above and below grating 38, and the configuration of the grating 38 as well as the number of such gratings which are employed.

Figure 4:
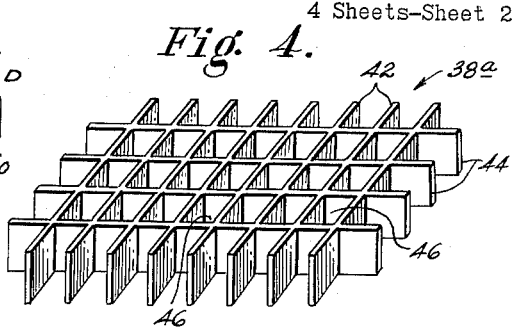
FIGS. 4 and 5 are perspective views similar to that of FIG. 3, but showing other forms of grids or gratings that can be employed in the filtering apparatus embodying the invention.

In general, it has been found that the dimensions of the cells in grating 38, that is, the distance D between adjacent strips or bars 40 making up the grating, may vary between approximately 25 mm. and 300 mm.

Where the particles of the filter bed have sizes less than 2 mm., it is desirable to employ a grating, for example, the grating 38a of FIG. 4, in the shape of an "egg-crate," that is, formed of two series of parallel strips or bars 42 and 44, respectively, extending at right angles to each other and intersecting so as to define substantially square cells 46 between intersecting bars 42 and 44 which cells open at the top and bottom of the grating 38a.

Figure 5:
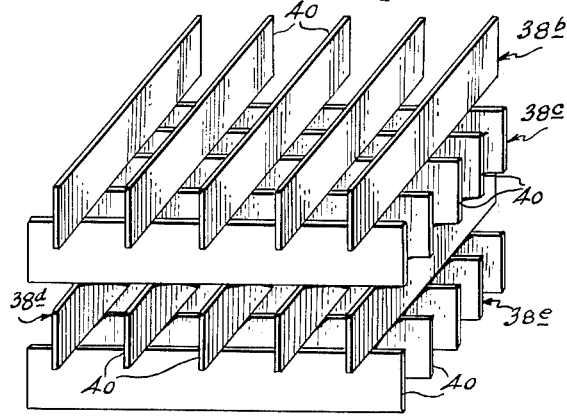

Further, in the case of a filter bed having granulated solids therein with particle sizes in the range between 0.3 mm. and 2.0 mm., and when it is desired to further increase the rate of flow of the liquid to be filtered through the filter bed, it is desirable to increase the security against cracking of the filter bed by employing a number of superposed gratings within the upper portion of the filter bed. Thus, as shown in FIG. 5, cracking of the filter bed in a filtering apparatus of the type illustrated in FIGS. 1 and 2 may be prevented by providing, within the upper portion of the filter bed, four superposed gratings generally identified at 38b, 38c, 38d and 38e. Each of the gratings is defined by parallel, spaced apart strips or bars 40, with the bars or strips 40 of the gratings 38c and 38e extending in directions at right angles to the bars or strips 40 of the gratings 38b and 38d.

Figure 6:
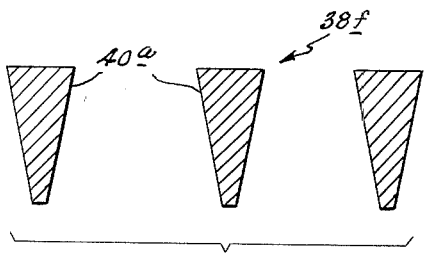
FIGS. 6 and 7 are detailed sectional views showing the profiles of elements that may be used in forming the grids or gratings included in a filtering apparatus in accordance with this invention.
Figure 7:
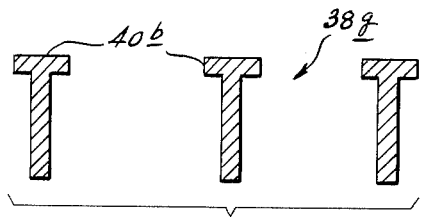

Although the individual strips or bars 40 (FIGS. 3 and 5) or 42 and 44 (FIG. 4) making up the grating or gratings disposed within the upper portion of the filter bed may have rectangular cross-sections, as previously described herein, so that the side wall surfaces of each cell defined between the adjacent strips or bars are parallel to each other, the resistance to cracking of the filter bed is still further increased if the opening of each cell at the top of the grating has a smaller area than the opening at the bottom of the grating. As shown in FIG. 6, the foregoing may be achieved by forming each grating 38f from strips or bars 40a having triangular cross-sections with the base of the triangular cross-section at the top of each strip or bar so that the latter has a greater cross-sectional width at the top than at the bottom thereof. Substantially the same result may be achieved, as shown in FIG. 7, by forming each grating 38g of strips or bars 40b having T-shaped cross-sections.

In addition to preventing cracking of the filter bed during normal operation of the filtering apparatus, the grating or gratings disposed within the upper portion of the filter bed in accordance with this invention further perform an important function during cleaning of the filter bed when the latter is formed of layers having different particle sizes, as in FIGS. 1 and 2. Such cleaning or washing of the filter bed is effected by passing water, air, steam, detergents or the like upwardly through the filter bed at a rate of flow very substantially higher than the normal rate of flow of the liquid to be filtered therethrough so that the bed is expanded or fluidized. During such washing or cleaning of the filter bed, the grating or gratings disposed therein tend to prevent circulation of the particles forming the filter bed so that, at the conclusion of the cleaning or washing operation, the particles of relatively large sizes will settle first at the bottom of the filter bed and the relatively small particles will settle at the top of the filter bed, thereby to provide a well classified filter bed, as is desirable.

Figure 8:
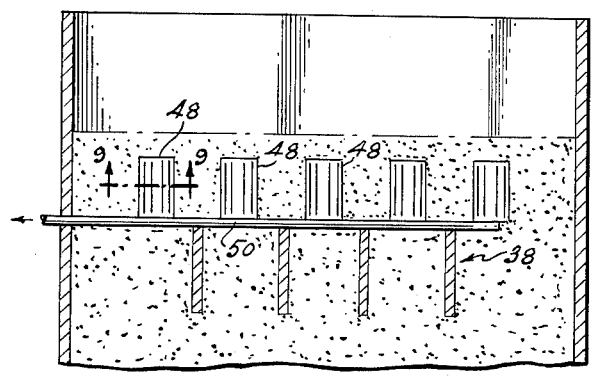
FIG. 8 is a fragmentary sectional view of a filtering apparatus embodying this invention, and in which drains are provided in the top portion of the filter bed for removing at least a part of the filtrate therefrom.

Since the effectiveness of the grating or gratings disposed in the upper portion of the filter bed in preventing cracking of the latter is dependent, to some extent, upon the continued maintenance of a certain depth H (FIG. 1) of the granulated filtering solids above the grating, and since there is a danger that the granulated solids above the grating will be carried away by the filtrate or effluent if the latter has a relatively high specific gravity or the top layer 20c of filter bed 20 is formed of relatively fine granulated solids of relatively low specific gravity, in the foregoing special case it may be desirable to remove the effluent or filtrate from the filter at a location either immediately above or below the grating 38, for example, through drains 48 (FIG. 8). In the case of an open or gravity filter, as shown in FIGS. 1 and 2, the drains 48 may be connected to a source of vacuum so as to at least partly avoid flow of the filtrate over the filter bed whereby expansion of the top part of the latter is prevented.

Figure 9:
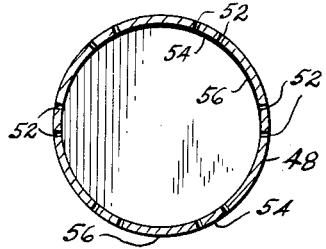
FIG. 9 is an enlarged sectional view taken on the line 9—9 of FIG. 8.

As shown in FIGS. 8 and 9, each of the drains 48 is preferably in the form of a thin walled tube which is closed at its upper end and has its lower end connected to a manifold pipe 50 connected, at one end, to a source of vacuum (not shown). The side wall of the tubular drain 48 is formed with slits 52 extending axially therein and being alternately spaced apart by relatively small and relatively large circumferential distances so that the side wall of the tubular drain 48 consists of alternating strips 54 and 56 having relatively smaller and relatively larger widths to flex in response to different differentials between the internal and external pressures. Such relative flexing of the adjacent strips 54 and 56 causes radial shifting of the edges of the slits 52 and thereby prevents clogging of such slits by the particles of the filter bed in which the drains are submerged.

If desired, clogging of the slits 52 of drains 48 may be further avoided by providing an auxiliary bed of granulated solids which are relatively coarse but of lower specific gravity, with such auxiliary bed containing the drains 48 and being disposed on top of the uppermost layer 20c of the filter bed made up of the finest particles and containing the grating 38. This arrangement is particularly advantageous when the filter bed consists of ion exchange material, and when it is desired to further increase the rate of flow of liquid through the filter bed without cracking of the latter.

Although it has been previously proposed to provide water filters or other water treating devices, for example, water softeners, with a grid of laterally-crossing partition plates resting upon the perforated dispersion plate through which the liquid to be treated is introduced at the bottom of the tank or housing, for example, as in United States Letters Patent No. 1,891,061, issued December 13, 1932, to R. O. Friend et al., comparative tests have shown that such a grid or grating disposed at the bottom of the tank or housing will not be effective to prevent cracking of the filter bed, whereas a similar grid or grating disposed in the filter bed adjacent the top thereof, as in accordance with the present invention, does prevent cracking of the filter bed. Such comparative tests are embodied in the following examples:

EXAMPLE 1

The tested filtering apparatus comprises a housing of circular cross-section having an inner diameter of 900 mm. and a height of 3,000 mm. A perforated false bottom is disposed within the housing and spaced from the bottom of the latter by a distance of 200 mm. so as to act as a dispersion plate for the liquid to be filtered which is introduced into the housing between the bottom thereof and the perforated false bottom. Disposed on the perforated false bottom is a gravel sub-fill having a total depth of 400 mm. and consisting of three layers of gravel which are relatively coarse, medium and fine. The filter bed itself, consisting of river sand having a grain size of 1 to 2 mm., is disposed on the above described gravel sub-fill and has a depth of 1600 mm.

In accordance with the disclosure in U.S. Letters Patent No. 1,891,061, which is identified more fully above, a grid of laterally-crossing partition plates is disposed upon the perforated dispersion plate at the bottom of the gravel sub-fill. Such grid is formed of plates having a thickness of 6 mm. and a depth or vertical height of 200 mm., with a distance between the adjacent plates of 200 mm.

The liquid to be filtered is river water and the content of solid material or impurities therein and also in the effluent or filtrate is determined by filtering through a fiber glass filter. Since the top of the filter bed is in communication with the atmosphere, the pressure loss due to passage of the liquid through the filter is simply determined by a vertical transparent tube connected with the bottom of the filter and calibrated to indicate the pressure loss as meters of water column.

The following results were obtained:

(A) *Rate of flow of 10 m.³ water per m.² cross-section per hour*

| Time of run (hrs.) | Total flow of water (m.³ water/m.² of cross-section) | Solid material in water (mg./liter) | | Pressure loss (m. of water column) |
|---|---|---|---|---|
| | | Raw water | Filtered water | |
| 1 | 10 | 30 | 6 | ----- |
| 5 | 50 | 40 | 7 | 0.35 |
| 24 | 240 | 43 | 35 | 0.25 |
| 72 | 720 | 52 | 50 | 0.3 |

(B) *Rate of flow of 15 m.³ water per m.² cross-section per hour*

| Time of run (hrs.) | Total flow of water (m.³ water/m.² of cross-section) | Solid material in water (mg./liter) | | Pressure loss (m. of water column) |
|---|---|---|---|---|
| | | Raw water | Filtered water | |
| 0.25 | 3.75 | 53 | 9 | 0.35 |
| 1 | 15 | 60 | 9 | 0.35 |
| 5 | 75 | 45 | 14 | 0.3 |
| 24 | 360 | 48 | 42 | 0.3 |
| 48 | 720 | 55 | 60 | 0.35 |

It will be seen that the turbidity of the effluent began to increase almost from the beginning of each run due to the appearance of cracks in the filter bed so that the apparatus is useless for any practical purposes. The fact that the pressure loss remained almost constant is to be expected as the filter did not remove any suspended matter from the raw water.

It is also interesting to note that, in the case of the higher flow rate, the effluent contained more solid material than the raw water after 48 hours of running time, indicating that solid material removed from the raw water at the beginning of the run was returned or released to the effluent at the end of the run.

EXAMPLE 2

A filtering apparatus identical to that described above in Example 1, but with the exception that the grid of laterally crossing plates is disposed with its top at a distance of 100 mm. below the top of the filter bed, as in accordance with the present invention, is operated under the same conditions as the filter in Example 1, and the following results are obtained:

(A) *Rate of flow of 10 m.³ water per m.² cross-section per hour*

| Time of run (hrs.) | Total flow of water (m.³ water/m.² of cross-section) | Solid material in water (mg./liter) | | Pressure loss (m. of water column) |
|---|---|---|---|---|
| | | Raw water | Filtered water | |
| 1 | 10 | 30 | 6 | ------ |
| 5 | 50 | 40 | 3 | 0.3 |
| 24 | 240 | 43 | 2 | 0.4 |
| 72 | 720 | 52 | 1.5 | 1.8 |

(B) *Rate of flow of 15 m.³ water per m.² of cross-section per hour*

| Time of run (hrs.) | Total flow of water (m.³ water/m.² of cross-section) | Solid material in water (mg./liter) | | Pressure loss (m. of water column) |
|---|---|---|---|---|
| | | Raw water | Filtered water | |
| 0.25 | 3.75 | 53 | 8 | 0.3 |
| 1 | 15 | 60 | 5 | 0.3 |
| 5 | 75 | 45 | 3 | 0.35 |
| 24 | 360 | 48 | 4.5 | 0.5 |
| 48 | 720 | 55 | 4.0 | 2.0 |

From the above, it is apparent that, when the grid of laterally crossing plates is disposed within the filter bed adjacent the top of the latter, cracking of the filter bed is avoided and good filtration is achieved even with rates of flow as high as 10 or 15 cubic meters water per square meter of cross-section per hour. It will be noted that conventional downflow sand filters operate usually at a rate of flow of 2 to 3 gallons per square foot per minute, whereas the flow rates of 10 and 15 cubic meters per square meter per hour respectively correspond to 4.1 and 6.2 gallons per square foot per minute, and thus are very substantially greater than the rates of flow presently thought to be the maximum achievable with downflow sand filters. Accordingly, it is apparent that the disposition of the grid or grating in the upper portion of the filter bed makes it possible to operate a filter of the upflow type at a rate of flow that is substantially greater than the rates of flow possible with downflow filters, and that the same results surely cannot be achieved with an upflow filter having the grid at the bottom thereof, as in Example 1.

EXAMPLE 3

The filtering apparatus used herein is the same as that in Example 2, with the exception that the grid or grating disposed within the filter bed adjacent the top thereof has a height of 30 mm., and the results obtained therewith are similar to those obtained in Example 2, as indicated below:

(A) *Rate of flow of 10 m.³ water per m.² of cross-section per hour*

| Time of run (hrs.) | Total flow of water (m.³ water/m.² of cross-section) | Solid material in water (mg./liter) | | Pressure loss (m. of water column) |
|---|---|---|---|---|
| | | Raw water | Filtered water | |
| 1 | 10 | 30 | 7 | 0.2 |
| 5 | 50 | 40 | 4 | 0.3 |
| 24 | 240 | 43 | 3 | 0.35 |
| 72 | 720 | 52 | 1.5 | 1.7 |

(B) *Rate of flow of 15 m.³ water per m.² of cross-section per hour*

| Time of run (hrs.) | Total flow of water (m.³ water/m.² of cross-section) | Solid material in water (mg./liter) | | Pressure loss (m. of water column) |
|---|---|---|---|---|
| | | Raw water | Filtered water | |
| 0.25 | 3.75 | 53 | 9 | 0.3 |
| 1 | 15 | 60 | 6 | 0.35 |
| 5 | 75 | 45 | 5 | 0.3 |
| 24 | 360 | 48 | 4 | 0.55 |
| 48 | 720 | 55 | 4.5 | 1.9 |

EXAMPLE 4

The filtering apparatus as in Example 3 is provided with a second grid or grating, also having a vertical dimension of 30 mm., but being disposed below the first grid or grating at a distance of 400 mm. from the latter so that both grids or gratings are disposed in the upper portion of the filter bed of river sand with a depth of approximately 1100 mm. of the latter remaining below the lowermost grid or grating. The results obtained with this arrangement are as follows:

(A) *Rate of flow of 10 m.³ water per m.² of cross-section per hour*

| Time of run (hrs.) | Total flow of water (m.³ water/m.² of cross-section) | Solid material in water (mg./liter) | | Pressure loss (m. of water column) |
|---|---|---|---|---|
| | | Raw water | Filtered water | |
| 1 | 10 | 30 | 5 | 0.2 |
| 5 | 50 | 40 | 2 | 0.25 |
| 24 | 240 | 43 | 1.5 | 0.3 |
| 72 | 720 | 52 | ------ | 1.2 |

(B) *Rate of flow of 15 m.³ water per m.² of cross-section per hour*

| Time of run (hrs.) | Total flow of water (m.³ water/m.² of cross-section) | Solid material in water (mg./liter) | | Pressure loss (m. of water column) |
|---|---|---|---|---|
| | | Raw water | Filtered water | |
| 0.25 | 3.75 | 53 | 7 | 0.3 |
| 1 | 15 | 60 | 4 | 0.3 |
| 5 | 75 | 45 | 3 | 0.35 |
| 24 | 360 | 48 | 3 | 0.4 |
| 48 | 720 | 55 | 2.5 | 1.5 |

A comparison of the results in Example 4 with those in Example 3 will show that, in the case of two grids or gratings in the upper portion of the filter bed (Example 4), the turbidity of the effluent or filtrate is slightly less than the corresponding values in Example 3 (a single grid or grating), and further that the pressure loss increases more slowly indicating that longer filter runs are possible before it becomes necessary to wash or clean the filter, which operation is usually undertaken when the pressure loss has risen to about 1.5 to 2 meters of water column.

It has heretofore been proposed, for example, as in U.S. Letters Patent No. 2,944,009, issued July 5, 1960, to A. R. Huntley et al., to provide an apparatus for contacting a gas with a fluidized bed of dry, powdered solid, in which one or more perforated baffles are disposed within the fluidized bed and shaped so as to form numerous pockets in or beneath each baffle to trap the rising gasiform material so that its flow horizontally is restricted. The purpose of such baffle is to prevent the channeling of large gas bubbles up one side of the bed and to break up and redisperse any large gas bubbles or massive solid streams. One of the baffles disclosed in this patent consists of a perforated plate with ribs secured to the bottom surface thereof to form an egg-crate or cellular structure, and the perforations of the plate are dimensioned so that the free or open area of the baffle is from about 10 to 50%, preferably 25% of the total cross-sectional area of the reactor. The fluidized powdered solids of this patent are to be distinguished from the granular solids of the filter bed in the filter embodying the invention in that such granular solids are static, or at rest, during normal filtering operation. Although such a baffle may be effective in the case of a reactor for contacting a gas with a fluidized bed of powdered solid, tests have shown that the baffles disclosed in U.S. Letters Patent No. 2,944,009 are not effective in a filtering apparatus of the upflow type for preventing cracking of the filter bed while avoiding an excessive pressure loss in the filter; and further, such baffles make it impossible to wash the filter.

EXAMPLE 5

In performing these tests, the filtering apparatus of Example 1 is provided with a baffle of the type illustrated in FIG. 4 of U.S. Letters Patent No. 2,944,009, and being located approximately midway in the filter bed, that is, with the top of the baffle approximately 750 mm. below the top of the filter bed, as illustrated in FIG. 1 of that patent. The baffle consists of a flat horizontal perforated plate with a diameter corresponding to the internal diameter of the housing of the filter and having a thickness of 10 mm. The perforations of such plate are 37 mm. (1.5 inches) in diameter and are uniformly distributed over the surface of the plate to provide an open area equal to 25% of the total cross-sectional area of the filter. Depending from the perforated plate is a grid or egg-crate of ribs or dams each having a thickness of 10 mm. and a vertical height of 120 mm., with the vertical ribs or dams being spaced apart by 120 mm. The results of the tests are as follows:

(A) *Rate of flow of 10 $m.^3$ water per $m.^2$ of cross-section per hour*

| Time of run (hrs.) | Total flow of water ($m.^3$ water/$m.^2$ of cross-section) | Solid material in water (mg./liter) | | Pressure loss (m. of water column) |
|---|---|---|---|---|
| | | Raw water | Filtered water | |
| 1 | 10 | 45 | 5 | 0.4 |
| 5 | 50 | 48 | 2 | 1.4 |
| 24 | 240 | 43 | 1.5 | 3 |
| 72 | 720 | 50 | 2 | 12 |

(B) *Rate of flow of 15 $m.^3$ water per $m.^2$ of cross-section per hour*

| Time of run (hrs.) | Total flow of water ($m.^3$ water/$m.^2$ of cross-section) | Solid material in water (mg./liter) | | Pressure loss (m. of water column) |
|---|---|---|---|---|
| | | Raw water | Filtered water | |
| 0.25 | 3.75 | 55 | 8 | 0.5 |
| 1 | 15 | 50 | 5 | 0.8 |
| 5 | 75 | 48 | 3 | 2.0 |
| 24 | 360 | 53 | 3 | 4.0 |
| 48 | 720 | 52 | 2 | above 25 (not determined). |

From the above, it will be apparent that, with a baffle of the type disclosed in U.S. Letters Patent No. 2,944,009, the pressure loss rises to a level at which cleaning or backwashing of the filter is required after only approximately 5 hours of operation even with the lower rate of flow, that is, 10 cubic meters water per square meter cross-section per hour. However, it was found that backwashing, either with water alone, or with water and air, was impossible, thus making such apparatus useless as a filter. On the other hand, filtering apparatus having one or more grids or gratings in the filter bed adjacent the top thereof in accordance with the present invention, that is, with an open area of at least 75%, as in Examples 2, 3 and 4 above, can be operated for as long as 48 hours, in the case of a rate of flow of 15 cubic meters of water per square meter of cross-section per hour, or for as long as 72 hours, in the case of a rate of flow of 10 cubic meters water per square meter of cross-section per hour, before encountering an increase in the pressure loss which requires cleaning or backwashing of the filter, and such backwashing is easily carried out in a conventional manner.

In order to facilitate comparison of the results obtained with the filtering apparatus in accordance with the present invention, with a filtering apparatus constructed in accordance with U.S. Letters Patent No. 1,891,061, and with a filtering apparatus having a baffle as disclosed in U.S. Letters Patent No. 2,944,009, the results given in the tables of the foregoing Examples 1 to 5, inclusive, are presented graphically on FIGS. 10 and 11 which respectively relate to a rate of flow of 10 cubic meters of water per square meter of cross-section per hour and 15 cubic meters of water per square meter of cross-section per hour. In each of FIGS. 10 and 11, the curves identified by the numerals 1, 2, 3, 4 and 5 indicate the results of Examples 1, 2, 3, 4 and 5, respectively. It will be seen from FIGS. 10 and 11 that, when the grating is disposed at the bottom of the filter bed, there is no increase in the pressure drop, but there is also no filtering of the liquid (curves 1). On the other hand, when the grating has an open area of less than 75 percent, there is effective filtration, but at the expense of a rapid rise in pressure drop (curves 5), thereby requiring cleaning of the filter after a short period of operation, and such cleaning cannot be effected by conventional backwashing. The combination of effective filtration with a high rate of flow and a slow increase in the pressure drop is achieved only when the grating is disposed in the top portion of the filter bed and has an open area of at least 75 percent, in accordance with this invention (curves 2, 3 and 4) Further, the specified open area permits backwashing of the filter without difficulty.

Additional specific examples of filtering apparatus embodying the present invention follow:

EXAMPLE 6

River water containing up to 40 mg. of solids per liter is filtered through a filter as in FIGS. 1 and 2 with an apparent rate of flow of 8 $m.^3$ liquid per $m.^2$ cross-section per hour. The filter bed consists of river sand with a grain size of 1 to 2 mm. and a depth of 1.4 m. supported on a gravel sub-fill having a depth of 34 cm. The effluent contains 4 to 6 mg. of solids per liter. The filter may run 160 hours on the average before requiring cleaning or backwashing. For attaining this, a grating 38 according to FIGS. 1, 2 and 3 is disposed in the filter bed with the top of grating 38 100 mm. beneath the surface of the filter bed. The run can be increased considerably, to 220 hours on the average, if a second grating 38 is disposed in the filter bed 300 mm. under the first one. The distance D between the strips or bars 40 is 60 mm., while the height $h$ of the bars is 30 mm., and the thickness $t$ of the bars is 6 mm. At the end of the run the filter resistance has increased from 250 to 2000 mm. water column. The cleaning of the filter is effected as follows:

First, for 10 minutes, a mixture of 2 $m.^3$ of air and 0.4 $m.^3$ of water per $m.^2$ per minute is passed upwardly through the filter, thereafter, during four minutes, water alone is introduced in an amount of 1.5 $m.^3$ per $m.^2$ per minute. Then the filter can be used again.

EXAMPLE 7

Instead of river water, aerated iron-containing subsoil water is filtered as in Example 6. The filtration-speed is 10 $m.^3$ per $m.^2$ per hour, and the iron content is diminished from 9 to 0.1 mg. Fe per liter in the influent and effluent, respectively.

EXAMPLE 8

In the filtration according to Example 6, the distance D between the bars 40 of grating 38 is decreased to 30 mm. Now a total flow of about 3000 m.³ of water can be filtered in the same time, that is, in 160 hours, the pressure-loss however increasing to 3900 mm. water column without any breaching or cracking of the filter bed.

EXAMPLE 9

Purified thin juice of a beet sugar plant is passed through a filter according to Example 6 in which, 40 mm. beneath the surface of the filter bed, a grating 38 with a dimension D of 25 mm. and 200 mm. beneath this a grating 38 with a dimension D of 50 mm. are placed. The filter bed disposed above the gravel sub-fill is formed, for the most part, of cation-exchanger Imac C 12, loaded with Na-ions, of a grainsize of 0.6 to 0.9 mm. The juice must be decalcified by this operation. The apparent rate of flow is 8 m.³ per m.² per hour. The top 200 mm. of the filter bed is formed by a layer of an auxiliary medium of granules of polyvinylchloride with a grainsize of 3 to 5 mm.

The regeneration of the filter is preceded by backwashing after sweetening off the medium with a water flow from top to bottom. Finally a 10% solution of NaCl is passed through from top to bottom and is followed by washing out of the filter.

EXAMPLE 10

River water, containing 20 to 30 mg. per liter of suspended materials, is passed through an open filter similar to that in FIGS. 1 and 2. It has a length of 3 m., a width of 2 m. and a height of 1.50 m. At a distance of 20 cm. above the bottom a false bottom is fixed and carries 250 so-called rinsing heads or nozzles for distributing the influent and rinsing water.

A gravel sub-fill having a depth of 260 mm. is supported on top of the false bottom and, in turn, carries a filter bed of sand with a grainsize of 1–2 mm. and a depth of 740 mm.

15 cm. below the surface of the filter bed, 100 drains are regularly spaced apart. These drains are similar to the drains 48 of FIGS. 8 and 9, and are made of vertical stainless steel tubes with a diameter of 100 mm., a thickness of 1 mm. and a length of 100 mm. Each drain is formed with slits 1 mm. wide and 90 mm. long. There is a total of 19 slits, forming 19 strips therebetween which are alternately relatively wide and narrow, the wide strips being 2 mm. larger than the small ones.

50 m.³ water are introduced per hour beneath the false bottom, and the effluent is drained away at the outlet pipe on which the drains are supported. A vacuum of 2 m. water column is maintained in the drains. The filter is cleaned when the pressure-loss amounts to 10 m. water column. The effluent contains 1–4 mg. suspended materials per liter.

EXAMPLE 11

An open filter, as in FIGS. 1 and 2, has the following main dimensions: 8 m. long, 3 m. wide, 2.5 m. high.

A filter bed of 6 to 10 mm. particle size with a depth of 1800 mm. is supported on a gravel sub-fill with a depth of 350 mm.

150 mm. beneath the top surface of the filter bed is the upper rim of a grating 38 with a distance D of 200 mm., and which is constructed according to FIGS. 1, 2 and 3. 500 mm. lower down a second grating is installed with a distance D of 300 mm.

The filter is used for filtering the circulation water, by which sugarbeets are transported in a beet sugar plant. This water contains 5 g. solids per liter, which has to be reduced to .5 to 1 g. per liter. The circumstances under which this is accomplished are as follows:

The apparent rate of filtration is 5–6 m.³ per m.² per hour, 10–20 m.³ can pass through the filter before cleaning becomes necessary. The loss of pressure in the filter is then 5 m. of water column.

Although illustrative embodiments of the invention have been described above with reference to the accompanying drawings, it is to be understood that the invention is not limited to those precise embodiments, and that various changes and modifications may be effected therein without departing from the scope or spirit of the invention, except as defined in the appended claims.

What is claimed is:

1. A filtering apparatus of the upflow type, comprising a housing containing a filter bed of granular solids which are static during normal filtering operation, inlet means and outlet means respectively supplying a liquid to said housing and removing liquid from said housing at vertically spaced apart locations so that the liquid to be filtered is passed upwardly through said filter bed, and at least one grating extending across said housing within said filter bed, said grating being disposed adjacent the top of the filter bed and spaced downwardly from the top surface of the latter and also below said outlet means, said grating having an open area of at least 75% of the cross-sectional area of said housing to permit a relatively high rate of flow of the liquid through said filter bed while preventing cracking of the latter.

2. A filtering apparatus as in claim 1; wherein said grating includes spaced apart bars having vertically elongated cross-sectional shapes with distances therebetween in the range between approximately 25 and 300 mm.

3. A filtering apparatus as in claim 2; wherein said granular solids of the filter bed have grain sizes in the range between approximately 0.2 and 10.0 mm.

4. A filtering apparatus as in claim 2; wherein said cross-sectional shapes are rectangular.

5. A filtering apparatus as in claim 2; wherein said cross-sectional shapes are triangular and increase in width from the bottom to the top thereof.

6. A filtering apparatus as in claim 2; wherein said bars are T-shaped in cross-section.

7. A filtering apparatus as in claim 1; wherein said grating consists of parallel, spaced apart, horizontally extending bars having vertically elongated cross-sectional shapes with distances therebetween in the range between approximately 25 and 300 mm.

8. A filtering apparatus as in claim 1; wherein said grating consists of a plurality of superposed series of parallel, spaced apart, horizontally extending bars having vertically elongated cross-sectional shapes with distances therebetween in the range between approximately 25 and 300 mm.; and wherein the bars of adjacent series extend at right angles to each other.

9. A filtering apparatus as in claim 1; wherein said grating consists of first and second series of parallel, spaced apart, horizontally extending bars having vertically elongated cross-sectional shapes with distances therebetween in the range between approximately 25 and 300 mm.; and wherein said bars of the first series extend at right angles to, and intersect said bars of the second series to define cells therebetween which open freely at the top and bottom of the grating.

10. A filtering apparatus as in claim 1; wherein said outlet means includes drains disposed in said filter bed immediately adjacent said grating.

11. A filtering apparatus as in claim 10; further comprising means for connecting said drains to a source of vacuum so that at least part of the filtrate is withdrawn through said drains to prevent expansion of the filter bed above said grating.

12. A filtering apparatus as in claim 10; wherein each of said drains includes a thin-walled tube having axially directed, circumferentially spaced apart slits therein to permit the entry of the filtrate, said slits being alternately spaced apart by relatively large and small distances to define strips therebetween which flex at different differential pressures between the interior and exterior of the tube and thereby provide relative movements at the edges of said slits to prevent clogging of the latter.

13. A filtering apparatus as in claim 1; wherein said housing further contains an auxiliary bed of relatively coarse grains and relatively lower specific gravity disposed on top of said filter bed to permit relatively higher rates of flow of the liquid through said filter bed while avoiding cracking of the latter.

14. A filtering apparatus of the upflow type, comprising a housing containing a filter bed of granular solids which are static during normal filtering operation, inlet means and outlet means respectively supplying a liquid to be filtered to said housing and removing filtrate from said housing at vertically spaced apart locations so that the liquid to be filtered is passed upwardly through said filter bed, and a plurality of gratings extending across said housing at vertically spaced apart locations within the top portion of said filter bed and each having an open area of at least 75% of the cross-sectional area of the housing to permit a relatively high rate of flow of the liquid through the filter bed while preventing cracking of the latter, the uppermost of said gratings being spaced downwardly from the top surface of said filter bed and arranged below said outlet means.

References Cited by the Examiner

UNITED STATES PATENTS

| 1,442,348 | 1/23 | McDermet | 210—290 X |
| 2,119,923 | 6/38 | McIntyre | 210—164 |
| 2,268,607 | 1/42 | McGill | 210—279 X |
| 2,855,364 | 10/58 | Roberts | 210—275 X |
| 2,944,009 | 7/60 | Huntley et al. | |
| 2,973,097 | 2/61 | Snider | 210—289 X |

FOREIGN PATENTS 513,638  9/52  Belgium.

RUEBEN FRIEDMAN, *Primary Examiner.*

HERBERT L. MARTIN, *Examiner.*